(12) United States Patent
Hsich et al.

(10) Patent No.: US 6,689,440 B2
(45) Date of Patent: *Feb. 10, 2004

(54) METAL TUBING COATED WITH MULTIPLE LAYERS OF POLYMERIC MATERIALS

(75) Inventors: Henry S. Hsich, Cary, NC (US); Dennis C. Soles, Rochester Hills, MI (US)

(73) Assignee: TI Group Automotive Systems, LLC, Warren, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 10/153,416

(22) Filed: May 22, 2002

(65) Prior Publication Data

US 2003/0012907 A1 Jan. 16, 2003

Related U.S. Application Data

(63) Continuation of application No. 09/370,424, filed on Aug. 9, 1999, now Pat. No. 6,589,617, which is a continuation of application No. 08/806,232, filed on Feb. 24, 1997, now Pat. No. 5,972,450, which is a continuation-in-part of application No. 08/541,855, filed on Oct. 10, 1995, now abandoned.

(51) Int. Cl.⁷ .............................. B32B 1/08; F16L 11/14; F16L 9/02; F16L 9/147; F16L 9/18
(52) U.S. Cl. ................. 428/36.91; 428/35.9; 428/36.9; 138/137; 138/138; 138/139; 138/143; 138/146
(58) Field of Search ............................... 428/35.9, 36.9, 428/36.91; 138/137, 138, 139, 143, 146

(56) References Cited

U.S. PATENT DOCUMENTS

4,606,953 A * 8/1986 Suzuki et al. ............... 138/143
5,601,893 A * 2/1997 Strassel et al. ............. 428/35.9

FOREIGN PATENT DOCUMENTS

JP 58-42449 * 3/1983 ............. B32B/1/08

* cited by examiner

Primary Examiner—Harold Pyon
Assistant Examiner—Chris Bruenjes
(74) Attorney, Agent, or Firm—Jenner & Block, LLC

(57) ABSTRACT

A coated metal tubing arrangement comprises a metal tube. An inner layer of a first polymeric material is bonded to the tube to provide corrosion protection. The first polymeric material has a high crystallinity, a dampening factor of less than 0.05, and a flexural modulus of at least 100 MPa. An outer layer of a second polymeric material is extruded around the inner layer to absorb impact energies and to eliminate mechanical vibrations and acoustic noises. The second polymeric material has a dampening factor of at least 0.05 and a flexural modulus of less than 50 Mpa. The second polymeric material is a multi-phase polymer having at least one polymer component with a glass-transition temperature below room temperature.

19 Claims, 1 Drawing Sheet

METAL TUBING COATED WITH MULTIPLE LAYERS OF POLYMERIC MATERIALS

This is a continuation of U.S. patent application Ser. No. 09/370,424, filed on Aug. 9, 1999 now U.S. Pat. No. 6,589,617, which is a continuation of U.S. patent application Ser. No. 08/806,232, filed on Feb. 24, 1997, Pat. No. 5,972,450, which is a continuation-in-part of U.S. patent application Ser. No. 08/541,855, filed on Oct. 10, 1995, abandoned.

BACKGROUND OF THE INVENTION

This invention relates to metal tubing products, and more particularly, to metal tubing used in the automotive industry for applications such as brake lines, fuel lines and transmission oil cooling lines.

Tubing utilized in automotive applications requires corrosion and wear resistance that will allow it to last for the useful life of a vehicle. Also, the tubing must have abrasion resistance consistent with an automotive environment (i.e. stone impingement and chipping). Finally, the tubing should be able to isolate and absorb mechanical vibrations and acoustic noises. To satisfy these requirements, protective coating(s) are usually applied to metal tubing which is to be utilized in automotive applications.

Coatings used in the industry have generally been characterized by one or both of the following. First, a metallic substrate is deposited on the steel tube surface. Usually this is a sacrificial coating wherein the substrate corrodes before the metal tubing. Second, a barrier coating is deposited over the substrate to keep corrosive media from initiating corrosion and to provide increased abrasion resistance.

Examples of past materials and combinations of materials used as substrate and/or barrier layers in the automotive industry include: terne (an alloy of nominally 85% lead and 15% tin); zinc-rich paint over terne; a zinc-aluminum alloy (consisting of 95% zinc and 5% aluminum—available under the trademark GALFAN); aluminum rich paint over a GALFAN coating; electroplated zinc or zinc-nickel; PVF or PVDF over electroplated zinc; hot dip aluminum; epoxy and nylon.

These materials have been used as barrier and/or substrate layers in various combinations, but have experienced shortcomings that limit their usefulness. Prior art coating materials and methods have exhibited only limited resistance to wear and chipping from stone impingement and abrasion. Often, a shrinkable thermoplastic jacket is applied around conventionally coated tubes in order to provide improved chipping and wear resistance. Such methods, however, are very expensive and are not always effective. For example, shrinkable plastic jackets have only limited ability for absorbing or isolating mechanical vibrations and acoustic noises. Also, use of shrinkable plastic jackets is problematic in that the relatively high thickness of the jacket precludes its use under end fittings or connectors, thereby exposing the tube end to corrosion.

In order to overcome all of the problems (i.e. corrosion, wear, abrasion, chipping, stone-impingement, mechanical vibration, acoustic noise) encountered in automotive and fluid transport tubing applications simulaneously, specific polymer properties must be tailored for a tube coating. Since no single polymeric material is effective in combatting all problems, an effective product will take into account the relationship of polymer structures and properties as well as material processing and engineering application considerations.

Accordingly, the present invention provides a unique multi-layer polymer coating on metal tubing which manipulates the dynamic mechanical properties of polymeric materials to achieve protection against multiple elements for metal tubing used in automotive or fluid transport applications. It combines the unique dynamic mechanical properties of two layers of polymers to provide maximum effectiveness in corrosion resistance and wear, abrasion, chipping and stone impingement protection. Moreover, the multi-layer coating of the present invention is effective at absorbing impact energy and eliminating mechanical vibration and acoustic noises.

SUMMARY OF THE INVENTION

The present invention provides a coated metal tubing arrangement. An inner layer of a first polymeric material surrounds a metal tube to provide corrosion protection.

An outer layer of a second polymeric material surrounds the inner layer to absorb impact energies and to eliminate mechanical vibrations and acoustic noises. The outer layer material is a multi-phase polymer having at least two polymer components. Each of these components has a distinct glass-transition temperature. The outer layer is unbonded to the inner layer.

An outer layer of a second polymeric material surrounds the inner layer to absorb impact energies and to eliminate mechanical vibrations and acoustic noises. The second polymeric material has a high dampening factor and a low flexural modulus. Preferably, the dampening factor is greater than 0.05 and the flexural modulus is less than 50 MPa. The outer layer material is a multi-phase polymer having at least two polymer components. Each of these components has a distinct glass-transition temperature, at least one of which should be below room temperature.

DETAILED DESCRIPTION OF THE INVENTION

Figure 1:
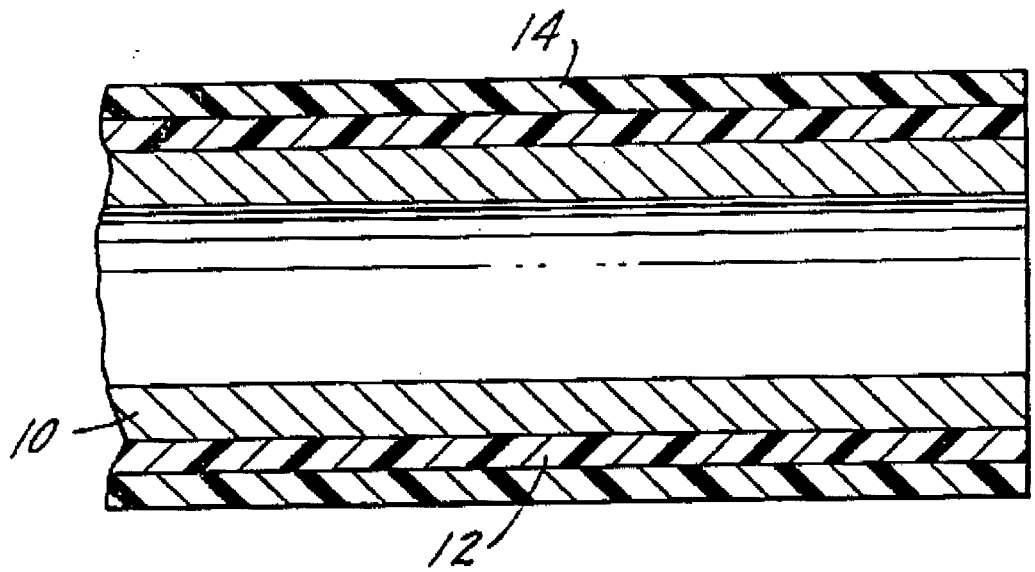
FIG. 1 is a sectional view of a portion of a coated metal tubing arrangement according to the present invention.
Figure 2:
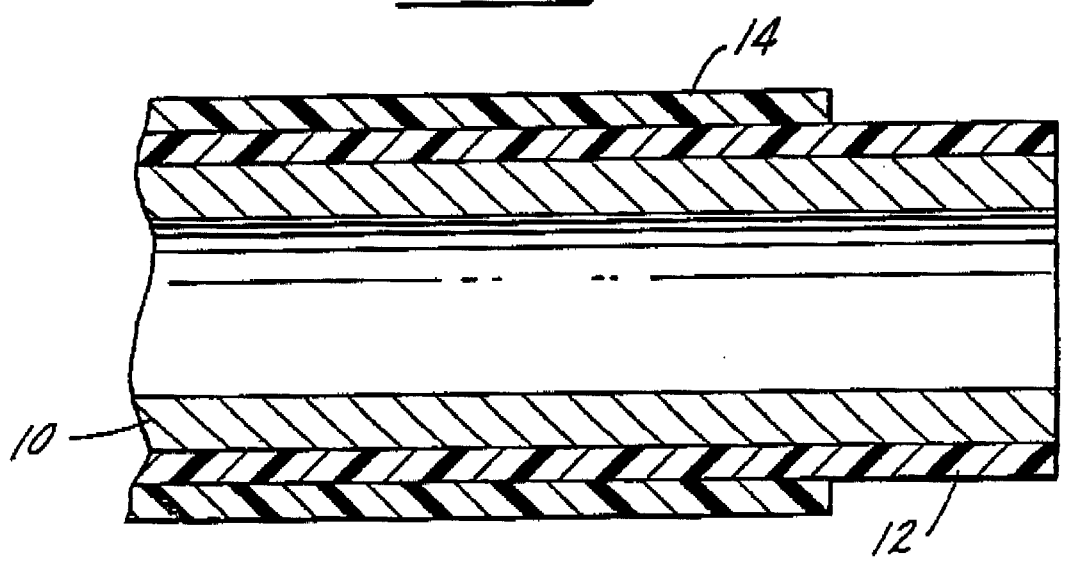
FIG. 2 is a sectional view of the tubing arrangement of FIG. 1 having one end stripped to facilitate connection to end fittings.

FIG. 1 illustrates a metal tube 10 coated according to the present invention. Tube 10 is coated by an inner layer 12 of a first polymeric material and an outer layer 14 of a second polymeric material. Inner layer 12 is bonded to metal tube 10 and outer layer 14 is extruded around inner layer 12. Layers 12 and 14 are not bonded together through use of an adhesive or any other bonding method. This is advantageous as it permits outer layer 14 to be stripped at the ends of tube 10 (FIG. 2), which facilitates connection to end fittings or connectors.

Numerous considerations are involved in choosing the particular polymer materials or blends which will comprise layers 12 and 14. The inner layer polymer must provide chemical resistance and prevent corrosion of metal tube 10. The outer layer polymer must absorb impact energy as well as eliminate mechanical vibration and acoustic noises. The outer layer polymer should also be amenable to easy stripping or removal for end fittings or connections.

The specific properties and structural attributes of particular polymers must be taken into account in order to achieve these results. For the inner layer polymer to have good chemical resistance, for example, it must have a high crystallinity. High crystallinity, however, decreases the ability of a polymer to absorb impact energy and to isolate mechanical vibrations and acoustic noises. This function is provided by the outer layer polymer.

Dynamic mechanical properties are the key in determining the ability of the outer layer polymer to eliminate mechanical vibrations and acoustic noises. These dynamic mechanical properties are briefly described below:

The modulus of a polymer is a function of temperature and frequency, ω, at measurement. The dampening factor of a polymer, tan $\beta_w$, is the ratio of the imaginary part of the modulus, $G_w''$, over the real part of the modulus, $G_w'$ (the storage modulus). The natural frequency, $\omega_o$, is the lowest noise frequency which can be eliminated by the mechanical system. The natural frequency, $\omega_o$, and the transmissibility, T, of a mechanical system can be expressed as a function of dynamic mechanical properties of polymers as follows:

$$\omega_o = \left(\frac{KG_o^1}{M}\right)^{1/2}$$

and $$T = \left[\frac{1 + \tan^2 \delta_w}{(1 - (\omega^2/\omega_o^2)(G_o^1/G_\omega^1)^2 + \tan^2 \delta_w}\right]^{1/2}$$

where K is a shape factor, M is the mass of the system, $G_o'$ and $G_w'$ are the shear storage moduli of the polymer at natural frequency $\omega_o$ and forced frequency ω, respectively, tan $\delta_w$ is a measure of polymer dampening at the forced frequency, and T is the transmissibility of the mechanical system.

Both dynamic modulus and dampening are functions of temperature and frequency. These mechanical properties can be manipulated by tailoring the molecular structures of polymers. To that end, one can achieve a low natural-frequency vibration system by reducing the storage modulus of the polymer in question. In addition, one can suppress the resonant transmissibility by choosing polymers with high dampening factors.

Inner layer 12, as stated above, is comprised of a polymeric material which is chosen for its chemical and liquid resistance. Layer 12 is bonded to the underlying metal tube 10 and keeps corrosive media from reaching or attacking tube 10. The polymeric material chosen for layer 12 should be particularly resistant to corrosive media or fluids commonly encountered in automotive applications, such as brake fluid, engine oil and fuel.

To achieve these ends, the polymeric material of inner layer 12 must have high crystallinity and a low dampening factor. The dampening factor is the ratio of the imaginary part of the storage modulus over the real part of the modulus and, for inner layer 12, is preferably less than 0.05. The polymeric material of inner layer 12 should also have a flexural modulus of at least 100 MPa.

Suitable polymeric materials for inner layer 12 include, but are not limited to, polyamides (nylons), polyimides, polyesters, fluoroplastics (such as polyvinyl fluoride or polyvinylidene fluoride), epoxies, polyphenylene sulfides, polyacetals, phenolic resins, polyketones and polyolefins.

Outer layer 14 is comprised of a polymeric material which is extruded around inner layer 12. Layer 14 is unbonded, or weakly bonded, to inner layer 12. It is complementary to inner layer 12 in that, while inner layer 12 provides protection against chemicals and corrosive liquids, outer layer 14 provides resistance to chipping and wear from stone impingement and abrasion. Outer layer 14 is also responsible for absorbing impact energy as well as eliminating mechanical vibration and acoustic noises. Heat insulation and thermal protection are also provided by layer 14.

The polymeric material of outer layer 14 is a multi-phase polymer. The term "multi-phase" indicates that the material is a blend or copolymer of two or more polymers. By being comprised of two or more polymer components, the outer layer polymeric material can be tailored with specific dampening characteristics (natural frequency and transmissibility) to isolate or absorb forced frequencies of mechanical vibrations and acoustic noise.

The multi-phase polymer of outer layer 14 has a high dampening factor of at least 0.05. Preferably, the dampening factor is between 0.1 and 0.3 in an application temperature range between −50 and 150 degrees Celcius. This high dampening factor provides for more dissipation of impact energy than does the lower dampening factor of the inner layer. The flexural modulus of the outer layer polymer should be lower than 50 MPa. A lower flexural modulus means that the polymeric material is less stiff (more flexible) than the polymer of the inner layer.

The wall thickness of outer layer 14 should be greater than 50 microns. The preferred wall thickness is between 200 and 500 microns.

Use of a multi-phase polymer having at least two different polymer components is advantageous in that each component will have a distinct glass-transition temperature. At temperatures near the glass-transition temperature of a polymer, the polymer has a very high dampening factor. Providing a multi-phase polymer with multiple glass-transition temperatures, therefore, will provide high dampening factors over a wide temperature range and, consequently, will provide the best ability to eliminate mechanical vibrations and acoustic noises under engineering service environments.

Preferably, at least one of the polymer components of the outer layer will have a glass-transition temperature below room temperature (22 degrees Celcius) and the other polymer component will have a melting point above 100 degrees Celcius. It is also preferred that one polymer component be a rubbery phase and the other component be a thermoplastic phase.

Outer layer 14 also have a high degree of heat resistance. Heat reflective fillers may be added to the polymeric material of layer 14 to enhance heat resistance.

Suitable multi-phase polymeric materials for outer layer 14 include, but are not limited to, copolymers or polymer blends (or alloys) of polyamides, polyesters, polyolefins, polyurethane and polyvinyl chloride. Thermoplastic polyolefin (TPO) is a specific example of a suitable polymer blend.

Prior to application of layers 12 and 14 over metal tube 10, tube 10 may be surface treated with a substrate to further enhance corrosion resistance. Suitable materials for surface treatment of tube 10 include chromate, phosphate, zinc, aluminum-rich paint, zinc-aluminum substrates, zinc-nickel substrates or a mixture of these materials. This will further enhance corrosion-resistance.

Together, the unique dynamic mechanical properties of layers 12 and 14 combine to provide outstanding performance and to achieve multiple protections for metal tubing used in automotive or fluid transport applications. Inner layer 12 provides protection against harmful chemicals and corrosive liquids, while outer layer 14 provides resistance against wear, abrasion, chipping and stone impingement, absorbs impact energy, and isolates or absorbs mechanical vibrations and acoustic noises.

Following are examples of specific tube coating arrangements according to the present invention. These examples are provided for illustrative purposes only and are not intended, or to be construed, as limiting the scope of this invention.

EXAMPLE 1

A steel tube was surface treated with a zinc-aluminum substrate. An inner layer comprised of PVF (polyvinyl fluoride) was bonded to the surface-treated steel tubing. An outer layer comprised of a polymer blend of polyamide and EPDM rubber was extruded over the inner layer. The outer layer was stripped at the ends of the tube to provide for end fittings or connections.

EXAMPLE 2

A steel tube was surface treated with a zinc-aluminum substrate. An inner layer comprised of PVF was bonded to the surface-treated steel tubing. An outer layer comprised of a polymer blend of polyolefin and EPDM rubber was extruded over the inner layer. The outer layer was stripped at the ends of the tube to provide for end fittings or connections.

EXAMPLE 3

A steel tube was surface treated with a zinc-aluminum substrate. An inner layer comprised of extruded nylon was bonded to the surface-treated steel tubing. An outer layer comprised of a polymer blend of polyolefin and EPDM rubber was extruded over the inner layer. The outer layer was stripped at the ends of the tube to provide for end fittings or connections.

EXAMPLE 4

A steel tube was surface treated with a zinc-aluminum substrate. An inner layer comprised of extruded polyketone was bonded to the surface-treated steel tubing. An outer layer comprised of a polymer blend of polyamide and EPDM rubber was extruded over the inner layer. The outer layer was stripped at the ends of the tube to provide for end fittings or connections.

EXAMPLE 5

A steel tube was surface treated with a zinc-aluminum substrate. An inner layer comprised of extruded polyketone was bonded to the surface-treated steel tubing. An outer layer comprised of a polymer blend of polyolefin and EPDM rubber was extruded over the inner layer. The outer layer was stripped at the ends of the tube to provide for end fittings or connections.

EXAMPLE 6

A steel tube was surface treated with a zinc-aluminum substrate. An inner layer comprised of PVF was bonded to the surface-treated steel tubing. An outer layer comprised of a polymer blend of PVC (polyvinyl chloride) and nitrile rubber was extruded over the inner layer. The outer layer was stripped at the ends of the tube to provide for end fittings or connections.

EXAMPLE 7

A steel tube was surface treated with a zinc-aluminum substrate. An inner layer comprised of PVF was bonded to the surface-treated steel tubing. An outer layer comprised of a polymer blend of PVC and nitrile rubber was extruded over the inner layer. The outer layer was stripped at the ends of the tube to provide for end fittings or connections.

EXAMPLE 8

A steel tube was surface treated with a zinc-aluminum substrate. An inner layer comprised of PVF was bonded to the surface-treated steel tubing. An outer layer comprised of a copolymer of polyester thermoplastic elastomer was extruded over the inner layer. The outer layer was stripped at the ends of the tube to provide for end fittings or connections.

EXAMPLE 9

A steel tube was surface treated with a zinc-aluminum substrate. An inner layer comprised of extruded nylon was bonded to the surface-treated steel tubing. An outer layer comprised of a copolymer of polyester thermoplastic elastomer was extruded over the inner layer. The outer layer was stripped at the ends of the tube to provide for end fittings or connections.

EXAMPLE 10

A steel tube was surface treated with a zinc-aluminum substrate. An inner layer comprised of an epoxy was bonded to the surface-treated steel tubing. An outer layer comprised of a polymer blend of polyamide and EPDM rubber was extruded over the inner layer. The outer layer was stripped at the ends of the tube to provide for end fittings or connections.

EXAMPLE 11

A steel tube was surface treated with a zinc-aluminum substrate. An inner layer comprised of an epoxy was bonded to the surface-treated steel tubing. An outer layer comprised of a polymer blend of polyolefin and EPDM rubber was extruded over the inner layer. The outer layer was stripped at the ends of the tube to provide for end fittings or connections.

EXAMPLE 12

A steel tube was surface treated with a zinc-nickel substrate. An inner layer comprised of PVF was bonded to the surface-treated steel tubing. An outer layer comprised of a polymer blend of polyamide and EPDM rubber was extruded over the inner layer. The outer layer was stripped at the ends of the tube to provide for end fittings or connections.

EXAMPLE 13

A steel tube was surface treated with a zinc-nickel substrate. An inner layer comprised of PVF was bonded to the surface-treated steel tubing. An outer layer comprised of a polymer blend of polyolefin and EPDM rubber was extruded over the inner layer. The outer layer was stripped at the ends of the tube to provide for end fittings or connections.

EXAMPLE 14

A steel tube was surface treated with a zinc-nickel substrate. An inner layer comprised of extruded nylon was bonded to the surface-treated steel tubing. An outer layer comprised of a polymer blend of polyolefin and EPDM rubber was extruded over the inner layer. The outer layer was stripped at the ends of the tube to provide for end fittings or connections.

EXAMPLE 15

A steel tube was surface treated with a zinc-nickel substrate. An inner layer comprised of extruded polyketone was bonded to the surface-treated steel tubing. An outer layer comprised of a polymer blend of polyamide and EPDM rubber was extruded over the inner layer. The outer layer was stripped at the ends of the tube to provide for end fittings or connections.

EXAMPLE 16

A steel tube was surface treated with a zinc-nickel substrate. An inner layer comprised of extruded polyketone was bonded to the surface-treated steel tubing. An outer layer comprised of a polymer blend of polyolefin and EPDM rubber was extruded over the inner layer. The outer layer was stripped at the ends of the tube to provide for end fittings or connections.

EXAMPLE 17

A steel tube was surface treated with a zinc-nickel substrate. An inner layer comprised of PVF was bonded to the surface-treated steel tubing. An outer layer comprised of a polymer blend of PVC and nitrile rubber was extruded over the inner layer. The outer layer was stripped at the ends of the tube to provide for end fittings or connections.

EXAMPLE 18

A steel tube was surface treated with a zinc-nickel substrate. An inner layer comprised of PVF was bonded to the surface-treated steel tubing. An outer layer comprised of a copolymer of polyester thermoplastic elastomer was extruded over the inner layer. The outer layer was stripped at the ends of the tube to provide for end fittings or connections.

EXAMPLE 19

A steel tube was surface treated with a zinc-nickel substrate. An inner layer comprised of extruded nylon was bonded to the surface-treated steel tubing. An outer layer comprised of a copolymer of polyester thermoplastic elastomer was extruded over the inner layer. The outer layer was stripped at the ends of the tube to provide for end fittings or connections.

EXAMPLE 20

A steel tube was surface treated with a zinc-nickel substrate. An inner layer comprised of an epoxy was bonded to the surface-treated steel tubing. An outer layer comprised of a polymer blend of polyamide and EPDM rubber was extruded over the inner layer. The outer layer was stripped at the ends of the tube to provide for end fittings or connections.

EXAMPLE 21

A steel tube was surface treated with a zinc-nickel substrate. An inner layer comprised of an epoxy was bonded to the surface-treated steel tubing. An outer layer comprised of a polymer blend of polyolefin and EPDM rubber was extruded over the inner layer. The outer layer was stripped at the ends of the tube to provide for end fittings or connections.

Various features of the present invention have been described with reference to the embodiments shown and described. It should be understood, however, that modification may be made without departing from the spirit and scope of the invention as represented by the following claims.

What is claimed is:

1. A coated metal tubing arrangement comprising:
    a metal tube;
    an inner layer of first polymeric material surrounding said metal tube;
    an outer layer of a multi-phase polymer extruded immediately adjacent and surrounding said inner layer, said multiphase polymer having at least two polymer components, each of said polymer components having a distinct glass-transition temperature, said outer layer unbonded to said inner layer.

2. A coated tubing arrangement as claimed in claim 1 wherein said polymeric material forming said inner layer has a dampening factor of less than 0.05.

3. A coated metal tubing arrangement as claimed in claim 1 wherein said multi-phase polymer has a dampening factor of at least 0.05.

4. A coated metal tubing arrangement as claimed in claim 3 wherein said dampening factor of said multi-phase polymer is between 0.1 and 0.3 in an application temperature range between −50 and 150 degrees Celsius.

5. A coated metal tubing arrangement as claimed in claim 1 wherein said polymeric material forming said inner layer has a flexural modulus of at least 100 MPa.

6. A coated metal tubing arrangement as claimed in claim 1 wherein said multi-phase polymer has a flexural modulus lower than 50 MPa.

7. A coated metal tubing arrangement as claimed in claim 1 wherein said outer layer has a wall thickness greater than 50 microns.

8. A coated metal tubing arrangement as claimed in claim 7 wherein said outer layer has a wall thickness between 200 microns and 500 microns.

9. A coated tubing arrangement as claimed in claim 1 wherein fillers are disposed in said multi-phase polymer.

10. A coated metal tubing arrangement as claimed in claim 1 wherein said polymeric material forming said inner layer is selected from the group consisting of polyamide, polyvinyl fluoride, polyvinylidene fluoride, epoxies and an aluminum-based coating.

11. A coated metal tubing arrangement as claimed in claim 1 wherein said multi-phase polymer is comprised of copolymers or polymer blends of polymers selected from the group consisting of polyamides, polyesters, polyolefins, polyurethane and polyvinyl chloride.

12. A coated metal tubing arrangement comprising:
    a metal tube;
    an inner layer of fluoroplastic surrounding said metal tube;
    an outer layer of a blend of two or more polymers immediately adjacent and surrounding said inner layer, said polymer blend having at least two distinct glass-transition temperatures and at least two distinct melting points, at least one of said distinct glass-transition temperatures is below 22° C., at least one of said distinct melting points is above 100° C., said outer layer unbonded to said inner layer.

13. A coated metal tubing arrangement as claimed in claim 12 wherein said fluoroplastic forming said inner layer is polyvinyl fluoride.

14. A coated metal tubing arrangement as claimed in claim 12 wherein said fluoroplastic forming said inner layer is polyvinylidene fluoride.

15. A coated metal tubing arrangement comprising:

a metal tube:

an intermediate layer of fluoroplastic surrounding said metal tube;

an outer layer of a blend of two or more polymers immediately adjacent and surrounding said intermediate layer, said polymer blend having at least two distinct glass-transition temperatures and at least two distinct melting points, at least one of said distinct glass-transition temperatures is below 22° C. at least one of said distinct melting points is above 100° C. said outer layer unbonded to said intermediate layer;

said coated metal tubing arrangement further comprising an inner layer immediately adjacent and surrounding said metal tube, said intermediate layer of fluoroplastic immediately adjacent and surrounding said inner layer.

16. A coated metal tubing arrangement as claimed in claim 15 wherein material forming said inner layer is selected form the group consisting of chromate, phosphate and zinc.

17. A coated metal tubing arrangement comprising:

a metal tube;

an inner layer of nylon surrounding said metal tube;

an outer layer of a blend of two or more polymers immediately adjacent and surrounding said inner layer, said polymer blend having at least two distinct glass-transition temperatures and at least tow distinct melting points, at least one of said distinct glass-transition temperatures is below 22° C., at least one of said distinct melting points if above 100° C., said outer layer unbonded to said inner layer.

18. A coated metal tubing arrangement comprising:

a metal tube;

an intermediate layer of nylon surrounding said metal tube;

an outer layer of a blend of two or more polymers immediately adjacent and surrounding said intermediate layer, said polymer blend having at least two distinct glass-transition temperatures and at least tow distinct melting points, at least one of said distinct glass-transition temperatures is below 22° C., at least one of said distinct melting points if above 100° C. said outer layer unbonded to said intermediate layer;

said metal tubing arrangement further comprising an inner layer immediately adjacent and surrounding said metal tube, said intermediate layer of nylon immediately adjacent and surrounding said inner layer.

19. A coated metal tubing arrangement as claimed in claim 18 wherein material forming said inner layer is selected from the group consisting of chromate, phosphate and zinc.

* * * * *